United States Patent [19]

Bhate

[11] 4,349,757
[45] Sep. 14, 1982

[54] LINEAR OSCILLATING ELECTRIC MACHINE WITH PERMANENT MAGNET EXCITATION

[75] Inventor: Suresh K. Bhate, Schenectady, N.Y.

[73] Assignee: Mechanical Technology Incorporated, Latham, N.Y.

[21] Appl. No.: 148,040

[22] Filed: May 8, 1980

[51] Int. Cl.³ ............................................. H02K 33/00
[52] U.S. Cl. ........................................ 310/15; 310/30
[58] Field of Search ....................... 310/15, 27, 30, 34, 310/35, 24, 73; 335/229, 230, 251, 255

[56] References Cited

U.S. PATENT DOCUMENTS

| | | | |
|---|---|---|---|
| 3,119,940 | 1/1964 | Pettit et al. | 310/30 |
| 3,336,488 | 8/1967 | Scott | 310/30 X |
| 3,349,247 | 10/1967 | Birkestrand | 290/1 |
| 3,366,809 | 1/1968 | Scott | 310/15 |
| 3,433,983 | 3/1969 | Keistman et al. | 310/12 X |
| 3,484,629 | 12/1969 | Kunz | 310/30 |
| 3,518,463 | 6/1970 | Abbott | 310/15 |
| 3,536,941 | 10/1970 | Tourtellotte | 310/30 X |

Primary Examiner—Donovan F. Duggan
Attorney, Agent, or Firm—Joseph V. Claeys; Arthur N. Trausch, III

[57] ABSTRACT

A linear electrodynamic machine is disclosed having permanent magnet excitation and an end flux leakage control. A flux carrying body having a plurality of annular magnets of alternating radially oriented polarities is disposed concentrically with respect to a stator having a plurality of annular wound coils. Relative axial reciprocation of the body and stator causes a reversal of the flux linking the coils while the flux in the body remains substantially constant. Focusing magnets provided on each end of the body and axial extensions provided on the stator insure uniformity of the alternating flux linking the coils and a constant flux intensity in the body to achieve high efficiencies.

11 Claims, 4 Drawing Figures

4,349,757

LINEAR OSCILLATING ELECTRIC MACHINE WITH PERMANENT MAGNET EXCITATION

BACKGROUND OF THE INVENTION

This invention relates to linear oscillating electric motor/alternators, and more particularly to such a machine having permanent magnet excitation and end flux leakage control.

Many power applications produce or require linear reciprocating motion and an energy converter which will convert the linear mechanical motion into electrical energy or will convert the electrical energy into linear reciprocating mechanical motion. Such an energy converter, commonly called a linear oscillating motor/alternator, typically has one member directly connected to the linear reciprocating mechanical member, and the other member is stationary.

The principle of operation of linear reciprocating motion converters can be divided into two main categories: flux switching and flux reversing. In the flux switching type the DC excitation coil which is the source of the main flux, is on the stationary member as are the AC coils. The flux linkage of the AC coils is switched from high to low level by movement of the plunger between its two extreme positions.

In the flux reversing type, the source of electromotive force is carried by the moving member or plunger. The coils are on the fixed member or stator, and the flux linking the coils goes from positive maximum to negative maximum as the plunger moves between its extreme positions. In both flux switching and flux reversing type machines, the change in the flux seen by the Ac coils causes a voltage to be induced in the coils of the same frequency as the oscillation of the plunger. When used as a motor, the stator coils carry the current which generates a driving flux that coacts with the plunger magnet flux to convert electrical to mechanical energy. When used in the alternator mode, the induced voltage delivers current and power to the outside load. The source of the exciting flux may be a coil or it may be a permanent magnet. Use of a permanent magnet for flux reversal machines avoids sliding or flexible current collectors.

Variants of these motors can be classified from yet another view point, depending on whether or not the moving member is used as a flux carrier. In either the flux switching or the flux reversing type, only a part of the magnetic circuit needs to move relative to the other part. When this can be achieved, it results in an extremely light plunger which is usually desirable. However, in such configuration the flux has to cross twice as many air gaps as required in the configurations where in the flux carrier also travels with a moving part of the magnetic circuit.

The flux reversing type permanent magnet motor/alternator has the inherent advantage that the flux linkage around the AC coils varies from positive maximum to negative maximum and therefore, offers the greatest potential for most efficient utilization of the flux generating or force generating structure. Its primary disadvantage, in prior art machines, is the large air gap in the return path of the flux in the magnetic circuit which greatly increases the reluctance of the circuit and decreases the intensity of the flux, and therefore, the power of the machine. Another serious problem in the prior art machines, is the short-circuiting of the flux by the method of attachment of the magnets to the moving body. The magnets are often embedded in the body which offers a short-circuiting path for the flux, thereby decreasing the proportion of the flux linking the AC coils. A third, and potentially the most serious problem, is the flux leakage at the ends of the machine. Unless the machine is designed to confine the flux to a low reluctance magnetic circuit around the coils, the flux at the ends of the machine will be lost in leakage paths, reuslting in large inefficiencies. In addition, hysteresis and eddy current losses in the motor materials at the ends of the machine, as a result of flux changes in the moving body, cause additional large power losses and result in lower efficiencies.

There are many applications for a linear reciprocating permanent magnet electric motor/alternator having a light weight plunger and a stationary stator having no moving contacts and using or producing single phase AC power. This device should have small side pull on the plunger to reduce the loads on the plunger bearings, and the machine must operate with high efficiency yet have a lower manufacturing cost.

SUMMARY OF THE INVENTION

Accordingly, it is an object to this invention to provide a linear reciprocating electric motor/alternator having permanent magnet excitation which works with extremely high efficiencies, may be made with a light weight moving plunger, and can be manufactured at low cost. High efficiencies are achieved by low eddy current losses which in turn are the consequence of a flux reversal design which maintains a constant flux level in the moving flux carrier.

These objects are achieved in one embodiment of the invention wherein a moving flux carrying body is disposed concentrically with respect to a stator having a plurality of annular wound coils. The surface of the body facing the stator carries a plurality of annular magnets having alternating radially oriented polarities. The annular magnets are axially spaced on centers equal to the axial spacing of the coil centers, and the axial separation between magnets is about equal to the axial gap in the coil slots. An extra half magnet is provided on each end of the body, and an axial extension is provided on the stator to insure uniformity of the alternating flux linking the coils and a constant flux intensity in the body.

DESCRIPTION OF THE DRAWINGS

The invention, and its many attendant objects and advantages, will become better understood upon reading the following detailed description of a preferred embodiment in conjunction with the following drawings, wherein.

DESCRIPTION OF THE PREFERRED EMBODIMENT

Figure 1:
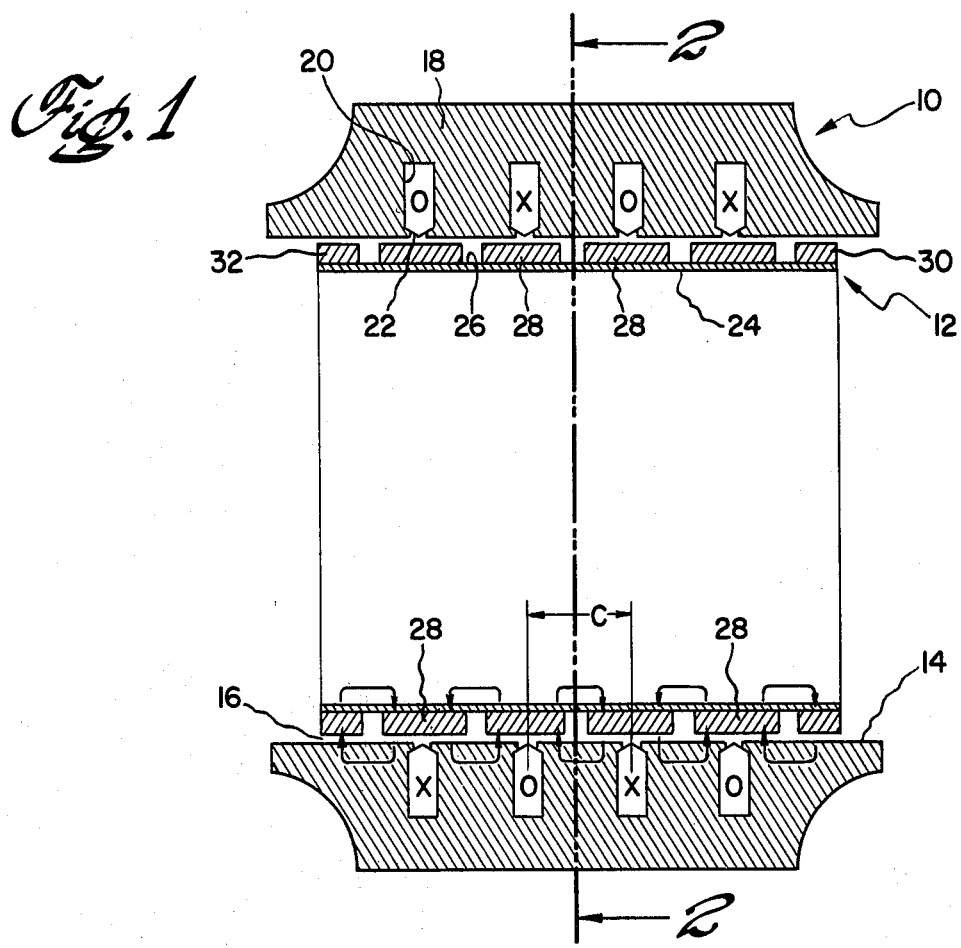
FIG. 1 is a sectional elevation of a linear alternating electric motor/generator made in accordance with this invention.

Turning now to the drawings wherein like reference numerals designate identical or corresponding parts, and more particularly to FIG. 1 thereof, a linear motor/alternator is shown having a stationary stator 10 and a movable plunger 12. The stator 10 is a cylindrical member mounted rigidly on a linear reciprocating machine. For example, it could be mounted on a stationary part in the interior wall of the hermetic vessel of a free-piston Stirling engine. The plunger 12 is mounted on a reciprocating member such as a power piston of a free-piston Stirling engine.

Figure 2:
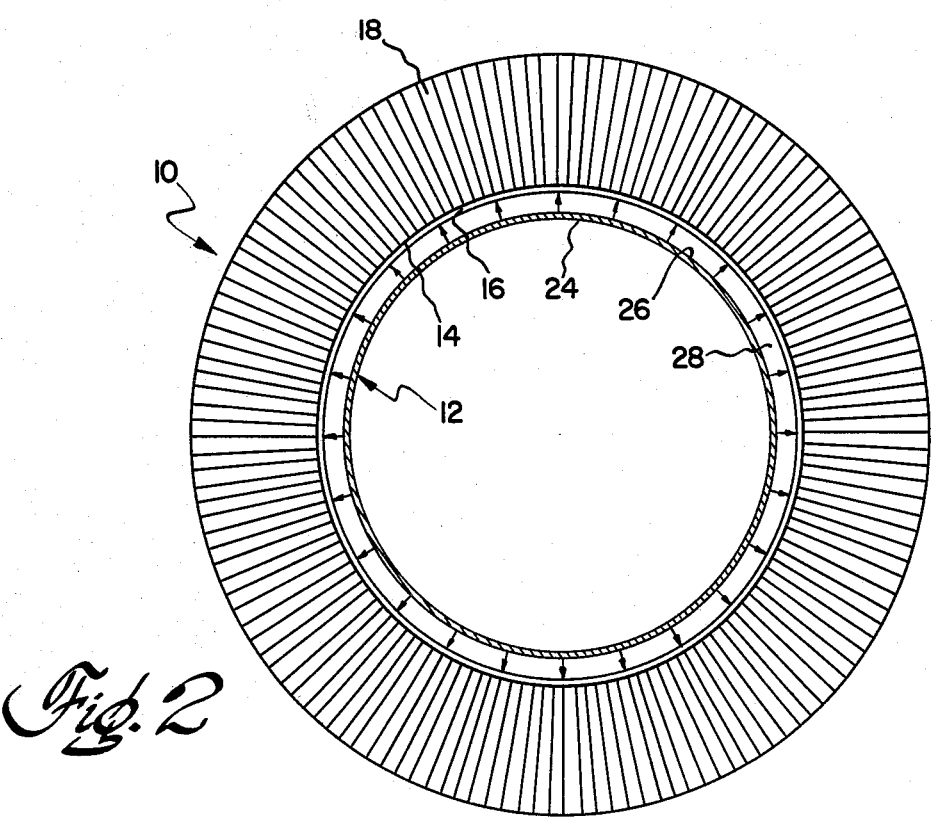
FIG. 2 is a sectional elevation along lines 2—2 in FIG. 1.

As shown in FIG. 2, the stator 10 is a cylindrical body having a cylindrical, axial passage 14 formed therein. The plunger 12 is likewise a cylindrical body having an external diameter slightly smaller than the internal diameter of the cylindrical passage 14. The plunger 12 is supported on journal bearings (not shown) which support the plunger radially while permitting movement of the plunger axially. A slight air gap 16 is provided between the plunger 12 and the stator 10 and this air gap is maintained by the journal bearings (which are not shown).

The stator 10 is formed of radial iron laminations 18 stacked in an annular pack to form the cylindrical body of the stator. For ease and economy of manufacture, the stator maybe formed in the manner taught by U.S. patent application, Ser. No. 879,778 for "Linear Electric Motor" filed on Feb. 21, 1978, by Ralph Hurst, now U.S. Pat. No. 4,206,373 issued June 3, 1980, whose disclosure is incorporated by reference herein.

Each of the radial laminations 18 has formed therein a series of holes 20 which open in the inner surface of the stator passage 14 in a slot 22. The holes 20 and slots 22 are circumferentially aligned to form annular channels opening in the inner passage 14 of the stator. The AC coils are wound in the channels 20 and connected with opposite polarities to an AC voltage source or an electrical load, depending on whether the device is used as a motor or an electrical alternator, in the manner known to those skilled in the art of permanent magnet motors.

The plunger 12 is formed of a cylindrical iron shell 24 to whose outer cylindrical surface 26 is attached a series of annular magnets 28, of alternating radially oriented polarities. The shell is suitably dimensioned to carry the magnetic flux without becoming saturated. The annular magnets 28 are spaced apart axially on centers equal to the axial spacing C between the channels 20 formed in the stator 10. The axial spacing between adjacent surfaces of adjacent magnets is approximately equal to the axial gap of the slots 22.

Figure 3:
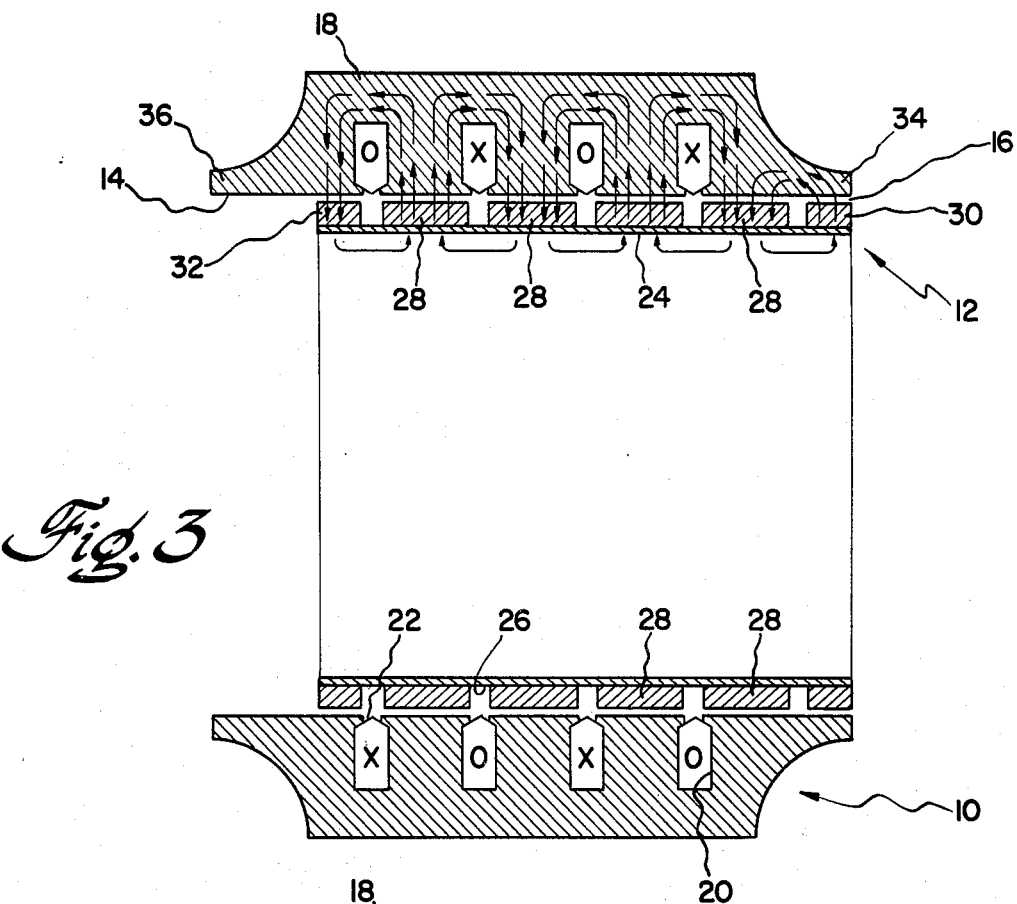
FIG. 3 is schematic diagram of the device shown in FIG. 1 with the plunger at its extreme rightward displacement and showing the flux path, and axis to the machine.

The operation of the device will be explained in conjunction with FIGS. 3 and 4 which show the extreme axial positions of the plunger 12. As shown in FIG. 3, with the plunger in its extreme right-most axial position, the magnets produce a flux path which links the four coils, as shown, with alternating right hand and left hand toroidal loops of flux. The portion of the flux path in the plunger shell 24 is shown with arrows inside the shell rather than within the shell wall, for clarity of illustration; however, it will be understood that the flux is actually restricted to the shell wall and does not leak to any appreciable extent into air inside the shell.

The right and left axial ends of the plunger 12 have mounted thereon a pair of annular magnets 30 and 32, respectively, which are half the axial length of the other four magnets 28 on the plunger. The purpose of the half magnets 30 and 32 is to guide and focus the flux linking the end coil at one end when the plunger 12 is displaced toward the other end. This arrangement prevents the flux linking the end coil from leaking away from the metal flux path as it would tend to do in the absence of the end focusing magnets. The end magnets also maintain a uniform air gap dimension so that the permeability of the magnet flux path remains substantially constant. In the absence of the focusing half magnets, the magnetic circuit around the end coil would include a large air gap which would substantially increase the reluctance of the magnetic circuit linking the end coil when the plunger is displaced in the opposite direction. This would cause a large variation in the flux linking the last coil and result in a large reduction in the force or electric power produced in the coil, and in addition, would result in a variation in the intensity of the flux in the end of the shell 24 which would cause losses by virtue of the eddy currents generated as a consequence of the magnetic flux variation.

The axial movement of the plunger 12 would tend to carry the focusing magnets 30 and 32 beyond the stator, which would result in a large change in the reluctance of the magnetic circuit for the end magnets and therefore, create large eddy current losses in the axial ends of the shell 24. To forestall these losses, two extensions 34 and 36 are provided on the right and left axial ends of the stator which extends axially beyond the end of the stator a distance equal to the axial spacing C between channel centers. This insures that the magnetic circuit through the focusing magnets 30 and 32 is not interrupted so that the flux path in the axial ends of the cylindrical shell or body 24 remains constant, thereby minimizing the hysteresis and eddy current losses.

Figure 4:
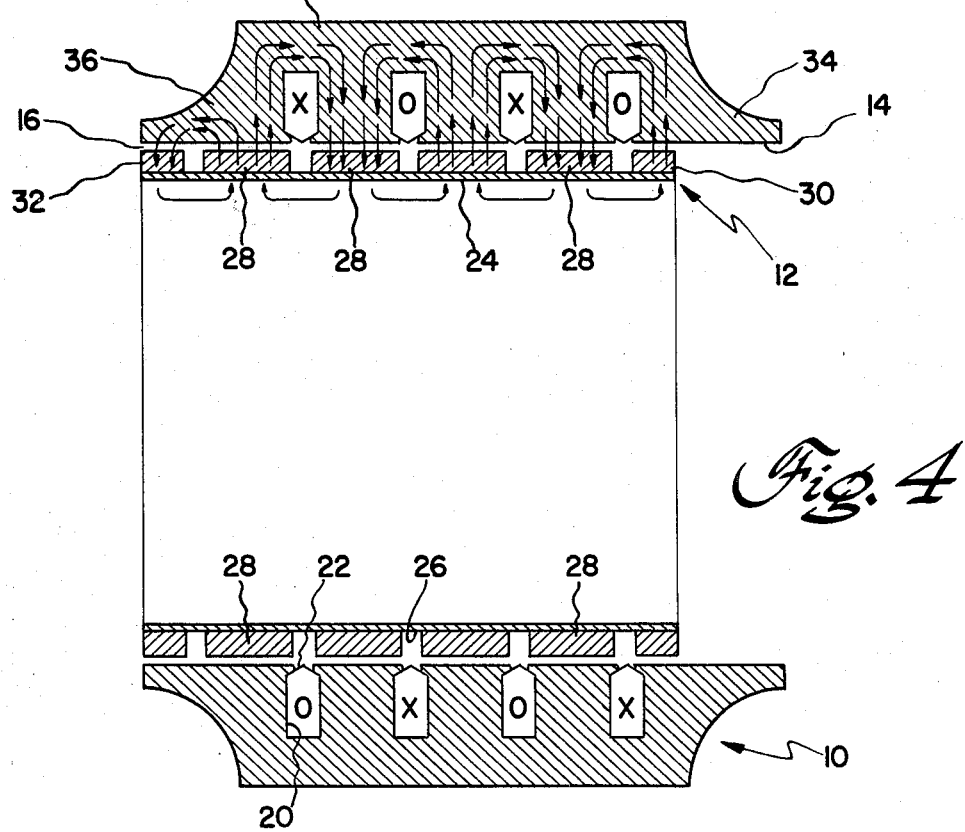
FIG. 4 is a schematic diagram similar to the diagram of FIG. 3 but with the plunger at the other extreme axial position.

As shown in FIG. 4, the plunger 12 is displaced toward its left-most extreme position and the flux paths linking the coils are shown to be linking these coils with the opposite sense. The flux thus varies from maximum plus to maximum minus thereby achieving the maximum flux variation of the flux coupling the coils. A comparison of the flux direction in the two extreme positions of the plunger shown in FIG. 4 illustrates that the flux direction in the cylindrical shell 24 does not change during reciprocation of the plunger, and therefore the hysteresis and eddy current losses in the shell 24 are minimized.

The invention disclosed utilizes a thin walled shell 24 which permits a great reduction in weight, so the spring losses in converting momentum in one direction to momentum in the opposite direction are greatly minimized. In addition, the frequency of the motor/alternator can be made high with the use of small end springs. There are no moving electrical contacts anywhere in the system which could wear and cause arcing and electrical interference. The side pull on the plunger 12 is low so that the journal bearings supporting the plunger for axial movement can be made small, light and inexpensive. Most importantly, the efficiency of the device is very high because maximum use is made by the flux reversal arrangement, the flux leakage has been minimized, and flux variation in the portions of the magnetic circuit not linking the coils has been greatly reduced.

Obviously, numerous modifications and variations of the disclosed embodiment are possible in light of this disclosure. For example, the position of the stator could be concentrically inside the moving plunger which would then reciprocate on the outside surface of the stator. In such an arrangement, the magnets would be facing inwardly and the slots 22 of the coil channels 20 would be facing outwardly. Other modifications will occur to those skilled in the art and it is expressly to be understood that these modifications and their equivalents may be practiced while remaining within the spirit and scope of the invention defined in the following claims.

I claim:

1. A permanent magnet linear power convertor, comprising:
   a body formed of magnetically permeable material and having a longitudinal axis;
   a stator having a longitudinal axis and mounted concentrically with respect to said body, said stator having a plurality of annular spaces formed therein;
   a plurality of coils, one disposed in each of said annular spaces and having leads for connection to an AC source or an electrical load;
   means for mounting said stator and said body for relative axial reciprocating movement;
   said stator having a surface facing said body;
   each of said annular spaces opening in said surface in a narrow circumferential slot of a predetermined axial width;
   said body having a surface facing said stator surface;
   a plurality of permanent magnets mounted on said body surface, said magnets having alternately oriented radial polarities, said magnets being spaced apart on centers equal to the corresponding spacing between said coils and with an axial gap about equal to the axial width of said circumferential slots;
   whereby relative axial reciprocation of said body and said stator will cause a reversal of the flux linking said coils, while the flux in said body remains substantially constant.

2. The device defined in claim 1, further comprising:
   focusing magnets at each axial end of said body for focusing the flux linking the end coil at the end of said stator remote from the stator end toward which said body is displaced to focus the flux linking said end coil through the focusing magnet at the adjacent end of said body and through the corresponding portion of said body, whereby the magnetic reluctance of the magnetic circuit for the flux linking said end coil will remain substantially constant and the flux linking said end coil will be substantially equal in intensity to the flux linking the other coils.

3. The device defined in claim 2, further comprising:
   a stator extension on each axial end of said stator, said extension extending in an axial direction approximately twice the amplitude of said reciprocating movement;
   whereby said extension provide a flux path for said focusing magnets at one end of said body when said body and said stator are displaced in the other extreme axial direction so that the flux intensity at the ends of said body remains substantially constant.

4. The power convertor in accordance with claims 1 or 3, wherein the number of alternate polarity magnets is equal to the number of coils.

5. The power convertor in accordance with claim 4, wherein said power convertor is an electric motor.

6. The power convertor in accordance with claim 4, wherein said power convertor is an alternator or generator.

7. A permanent magnet linear power convertor comprising:
   a body formed of magnetically permeable material and having a longitudinal axis;
   a stator having a longitudinal axis and mounted concentrically with respect to said body, said stator having a plurality of annular spaces formed therein;
   a plurality of coils, one disposed in each of said annular spaces and having leads for connection to an AC source or an electrical load;
   means for mounting said stator and said body for relative axial reciprocating movement;
   said stator having a surface facing said body;
   each of said annular spaces opening in said surface in a narrow circumferential slot of a predetermined axial width;
   said body including a plurality of permanent magnets having alternately oriented radial polarities, said magnets being spaced apart on centers equal to the corresponding spacing between said coils and with an axial gap about equal to the axial width of said circumferential slots;
   focusing magnets at each axial end of said body for focusing the flux linking the end coil at the end of said stator remote from the stator end toward which said body is displaced to focus the flux linking said end coil through the focusing magnet at the adjacent end of said body and through the corresponding portion of said body;
   whereby relative axial reciprocation of said body and said stator will cause a reversal of the flux linking said coils, while the flux in said body remains substantially constant and the magnetic reluctance of the magnetic circuit for the flux linking said end coil will remain substantially constant and the flux linking said end coil will be substantially equal in intensity to the flux linking the other coils.

8. The power convertor in accordance with claim 7, further comprising:
   a stator extension on each axial end of said stator, said extension extending in an axial direction approximately twice the amplitude of said reciprocating movement;
   whereby said extension provides a flux path for said focusing magnets at one end of said body when said body and said stator are displaced in the other extreme axial direction so that the flux intensity at the ends of said body remains substantially constant.

9. The power convertor in accordance with claim 8, wherein the number of alternate polarity magnets is equal to the number of coils.

10. The power convertor in accordance with claim 9, wherein said power convertor is an electric motor.

11. The power convertor in accordance with claim 9, wherein said power convertor is an alternator or generator.

* * * * *